US006987958B1

(12) United States Patent
Lo et al.

(10) Patent No.: US 6,987,958 B1
(45) Date of Patent: Jan. 17, 2006

(54) METHOD FOR COMBINING COMMUNICATION BEAMS IN A WIRELESS COMMUNICATION SYSTEM

(75) Inventors: Titus Lo, Redmond, WA (US); Dennis Rosenauer, Redmond, WA (US); Douglas Frank Stolarz, Monmouth Beach, NJ (US)

(73) Assignee: Cingular Wirless II, Inc., Redmond, WA (US)

( * ) Notice: Subject to any disclaimer, the term of this patent is extended or adjusted under 35 U.S.C. 154(b) by 336 days.

(21) Appl. No.: 10/046,243

(22) Filed: Jan. 16, 2002

Related U.S. Application Data

(63) Continuation of application No. 09/303,266, filed on Apr. 30, 1999.

(60) Provisional application No. 60/113,931, filed on Dec. 24, 1998.

(51) Int. Cl.
*H04B 1/06* (2006.01)
*H04B 7/00* (2006.01)

(52) U.S. Cl. .................. 455/269; 455/67.11; 455/101; 455/134; 455/277.2

(58) Field of Classification Search ............ 455/562.1, 455/101, 133, 277.2, 67.11, 134, 277.1, 161.3, 455/115.3, 575.7, 103
See application file for complete search history.

(56) References Cited

U.S. PATENT DOCUMENTS

| | | | | | |
|---|---|---|---|---|---|
| 5,396,256 | A * | 3/1995 | Chiba et al. | 342/372 |
| 5,557,603 | A * | 9/1996 | Barlett et al. | 455/278.1 |
| 5,621,752 | A * | 4/1997 | Antonio et al. | 375/144 |
| 5,691,729 | A * | 11/1997 | Gutman et al. | 342/374 |
| 5,722,049 | A * | 2/1998 | Hassan et al. | 455/101 |
| 5,757,318 | A * | 5/1998 | Reudink | 342/374 |
| 5,854,813 | A * | 12/1998 | Rottinghaus et al. | 455/101 |
| 5,894,598 | A * | 4/1999 | Shoki | 455/562 |
| 5,907,809 | A * | 5/1999 | Molnar et al. | 455/456 |
| 5,907,816 | A * | 5/1999 | Newman et al. | 455/562.1 |
| 5,912,927 | A * | 6/1999 | Smith et al. | 455/101 |
| 5,917,446 | A * | 6/1999 | Greenspan | 342/373 |
| 5,924,020 | A * | 7/1999 | Forssen et al. | 455/129 |
| 5,933,446 | A * | 8/1999 | Bond et al. | 375/200 |
| 6,055,230 | A * | 4/2000 | Feuerstein et al. | 370/335 |
| 6,064,338 | A * | 5/2000 | Kobayakawa et al. | 342/378 |
| 6,073,032 | A * | 6/2000 | Keskitalo et al. | 455/561 |
| 6,128,486 | A * | 10/2000 | Keskitalo et al. | 455/422.1 |
| 6,377,783 | B1 * | 4/2002 | Lo et al. | 455/101 |
| 6,397,082 | B1 * | 5/2002 | Searle | 455/562.1 |
| 6,694,154 | B1 * | 2/2004 | Molnar et al. | 455/562.1 |

* cited by examiner

*Primary Examiner*—Simon Nguyen
(74) *Attorney, Agent, or Firm*—Kenyon & Kenyon

(57) ABSTRACT

A method provides a technique for optimally combining communication beams. The method forms a plurality of beams from captured signals. One beam is selected as the primary beam while a subset of the others are applied to auxiliary receivers. A digital signal processor weights and combines these primary and secondary beams.

12 Claims, 2 Drawing Sheets

METHOD FOR COMBINING COMMUNICATION BEAMS IN A WIRELESS COMMUNICATION SYSTEM

CROSS REFERENCE TO RELATED APPLICATIONS

This patent application is a continuation of U.S. application Ser. No. 09/303,266, filed Apr. 30, 1999 entitled A METHOD FOR COMBINING COMMUNICATION BEAMS IN A WIRELESS COMMUNICATION SYSTEM, which is incorporated herein by reference.

The present application is related to U.S. Provisional Patent Application No. 60/113,931, filed on Dec. 24, 1998 and entitled METHOD FOR COMBINING COMMUNICATION BEAMS IN A WIRELESS COMMUNICATION SYSTEM.

BACKGROUND OF THE INVENTION

The present invention is directed to a method and apparatus for combining communication beams in a wireless communication system. More specifically, the present invention provides an arrangement whereby multiple received signals are weighted and combined to produce an optimally combined communication signal.

Wireless communication has been an area of increased growth over the last decade. In many instances, wireless communication is considered synonymous with mobile cellular communication which has evolved from providing voice only communications to making available voices and data communications along with a myriad of services related to both voice and data. It has also been determined that wireless communications provide an opportunity for establishing access into a communications network from a fixed location such that existing wire line communications can be bypassed. For instance, it has been suggested that a so-called fixed wireless service may provide the opportunity for communication service providers to access users at their home and thereby provide local area service similar to that presently provided by wireline local exchange carriers (LECs). In a fixed wireless system, it is envisioned that a transceiver device would be mounted on a building or dwelling and that each of the transceivers within a particular geographic area would communicate over the air with a given base station, much in the same way that mobile stations passing through a particular cell in a mobile communications environment communicate with the base station servicing that cell. An example of a fixed wireless system in which this communication technique is used is illustrated in FIG. 1. The system includes a base station 10 and a plurality of terminal stations 20, 21 and 22. These terminal stations may be fixed to a building or dwelling and are positioned within a particular distance range from the base station so as to enable wireless communications between the base station and the respective terminal stations.

One issue that is very significant in establishing the appropriate elements for the system relates to the extent to which the terminal station and base station in a given service area can communicate with low error rates or high signal-to-noise ratios. One technique for improving the communications between terminal stations and the base station is to provide an optimally positioned antenna structure for the terminal station. The structure can be particularly oriented with regard to the base station. The antenna structure is optimally positioned so as to exchange signals with the servicing base station. As one would expect, however, it is time consuming and labor intensive to install a fixed antenna that is positioned so precisely as to maximize the capture of signals from the base station and to improve signal-to-noise ratio. It would be beneficial if another technique was available so as to maximize the capture of signals by the antenna, yet selectively process those signals so as to optimally combine the radiation beams communicated between the base station and the terminal station. This would improve the signal-to-noise ratio for communications between those two elements.

SUMMARY OF THE INVENTION

The present invention provides a technique for optimally combining the communication beams between two wireless communication terminals. In the embodiment more specifically described, these terminals constitute a base station and a terminal station in a fixed wireless environment. Other wireless terminals may constitute the end points of such a communication system; for example, antennas in a satellite communication system could similarly profit from the beam combination technique of the present invention.

In that beam combination technique, a plurality of antennas receive or capture signals transmitted from the other station. A plurality of beams are then produced from the captured signals. A switch network selectively designates one of the beams to be processed by a primary receiver and some subset of the remaining beams to be processed by secondary receivers. A digital signal processor then weights the signals produced by the primary receiver and the secondary receiver(s) and combines the weighted signals in a manner to enhance the signal-to-noise ratio along the path between the two stations in question.

DETAILED DESCRIPTION

The present invention provides a technique by which a transceiver at one of the terminal points of a wireless communication can optimally combine signals received on a plurality of antennas so as to improve the signal-to-noise ratio with respect to the wireless channel between the two terminal devices. In the example that follows, reference is made to a fixed wireless system including a base station for servicing a geographic region and a terminal station which can be associated with a given subscriber to a fixed wireless service. It should be recognized that the technique described, while specifically described with reference to the transceiver at the user's terminal, can also be employed at the base station. Furthermore, this technique can be utilized in other wireless communication devices where it is appropriate to attempt to optimize the wireless communication channel between the two end points.

Figure 1:
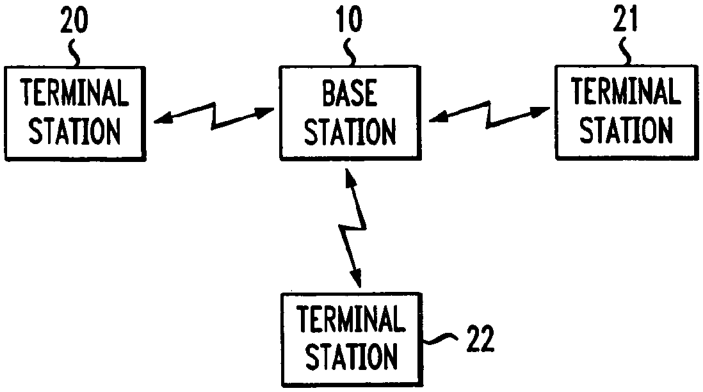
FIG. 1 PRIOR ART
FIG. 1 illustrates a known system in which the present invention can be employed.
Figure 2:
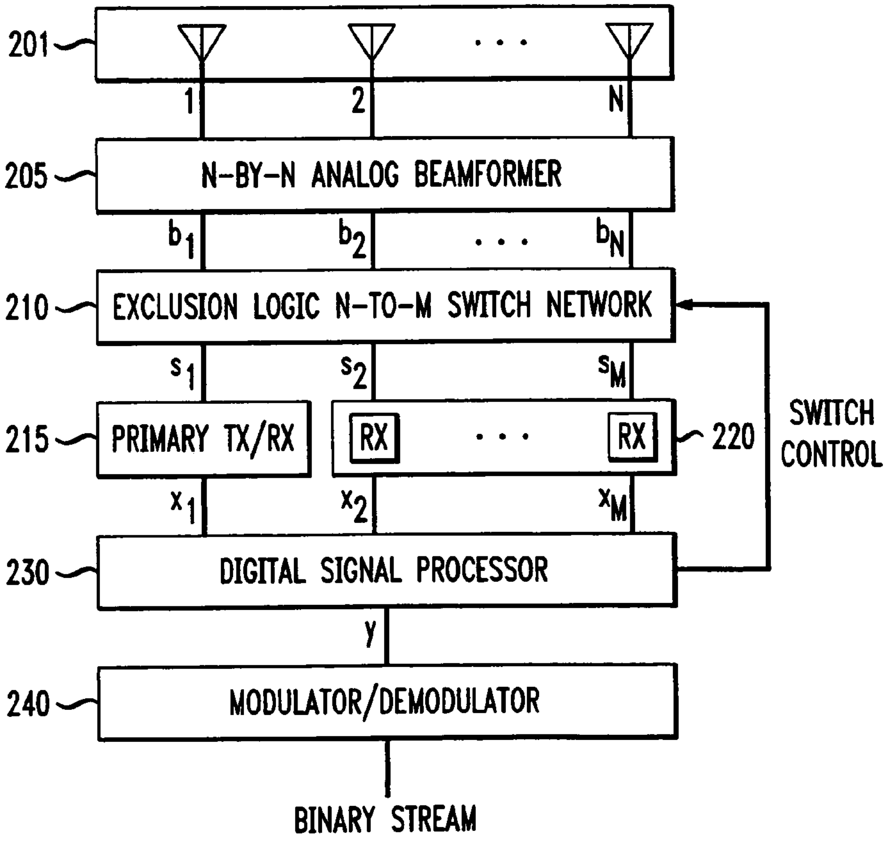
FIG. 2 illustrates a block diagram of an embodiment of the present invention.

In the sample system where the terminal station incorporates an embodiment of the present invention, the terminal station includes the elements illustrated in FIG. 2. More particularly, a multiple-element antenna array 201 captures signals transmitted by the base station. In the example shown, the array includes N antenna elements. The N-element antenna array can have a linear or circular geometry for intercepting energy. It should also be recognized that these very same antennas can be utilized in a transmission mode for transmitting information to the base station.

The N-element antenna array 201 is coupled to N-by-N analog beamformer 205. The beamformer is a multiple-beamformer network such as the one known in the art as a Butler matrix described in "Digital, Matrix, and Intermediate Frequency Scanning" by L. J. Butler, in R. C. Hansen, ed. *Microwave Scanning Arrays*, Academic Press, New York, 1966. That matrix uses hybrid junctions and fixed phase shifters to create N beams from the N antenna outputs. Thus, the output of the beamformer 205 is shown as beams $b_1$ to $b_N$. All of these beams, which can be orthogonal beams, are inputs to an exclusion logic N-to-M switch network 210. The switch network receives all N beams and, based on switching control signals from a digital signal processor 230, selects M of those beams for processing by a plurality of receivers. One beam is selected for transfer to the primary transceiver 215 and the remaining M−1 selected beams are provided to the auxiliary receivers shown together as element 220 in FIG. 2. The receivers then produce output signals which constitute received signals from the various produced beams, $x_1$ to $x_M$. These output signals from the receivers are provided to the digital signal processor (DSP) 230 which assigns weights to the received signals and then combines them in accordance with the digital signal processing algorithm, stored within the processor or in an adjunct memory, to provide an output signal y. That output signal is subsequently demodulated by the modulator/demodulator 240 to create a binary stream which includes the message received from the transmitter. By manipulation of the switching network configuration under control of the DSP and by the selection of multiple beams for processing, the present invention can improve the signal-to-noise ratio of the system by emphasizing the impact of beams that are constructive to the process and de-emphasizing the impact of beams that are not constructive to the process.

Figure 3:
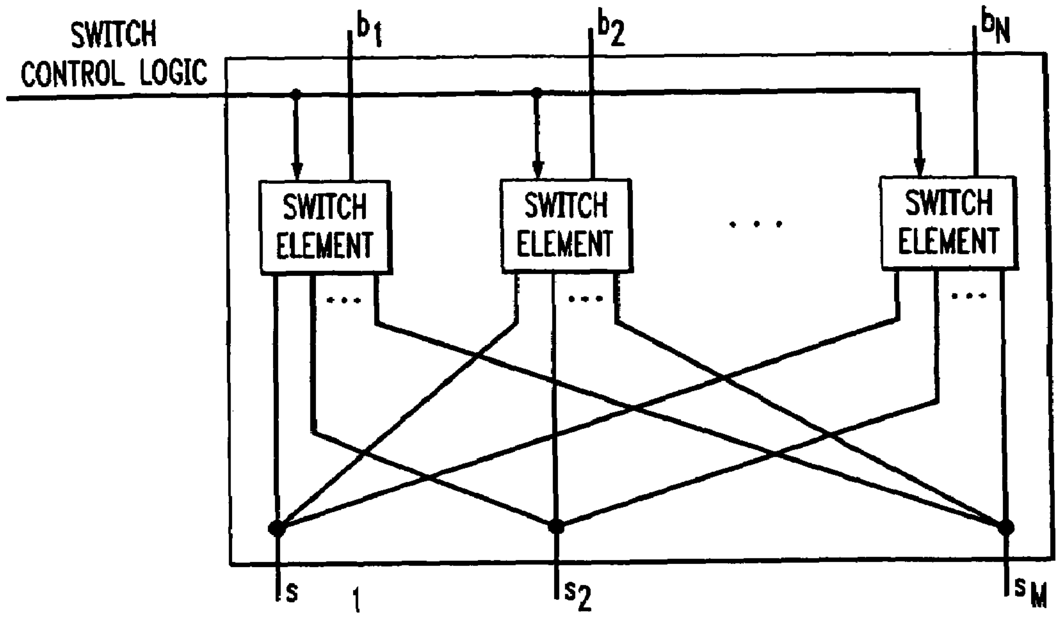
FIG. 3 illustrates a block diagram of a switch network which can be used in the embodiment of FIG. 2.

FIG. 3 is a block diagram illustrating a sample switch network which might be employed as the exclusion logic N-to-M switch network 210 of FIG. 2. The exclusion logic N-to-M radio frequency (RF) switch network consists of N switch elements (described below in relation to FIG. 4), N inputs receiving beams $b_1$ to $b_N$, and M outputs, $s_1$ to $s_M$. Each switch element receives one of the beams and selects the beam to either be transferred to one of the output ports $s_1$ to $s_M$ or switched to a terminating load based on switch control logic applied to the switch element from the digital signal processor 230 of FIG. 2.

Figure 4:
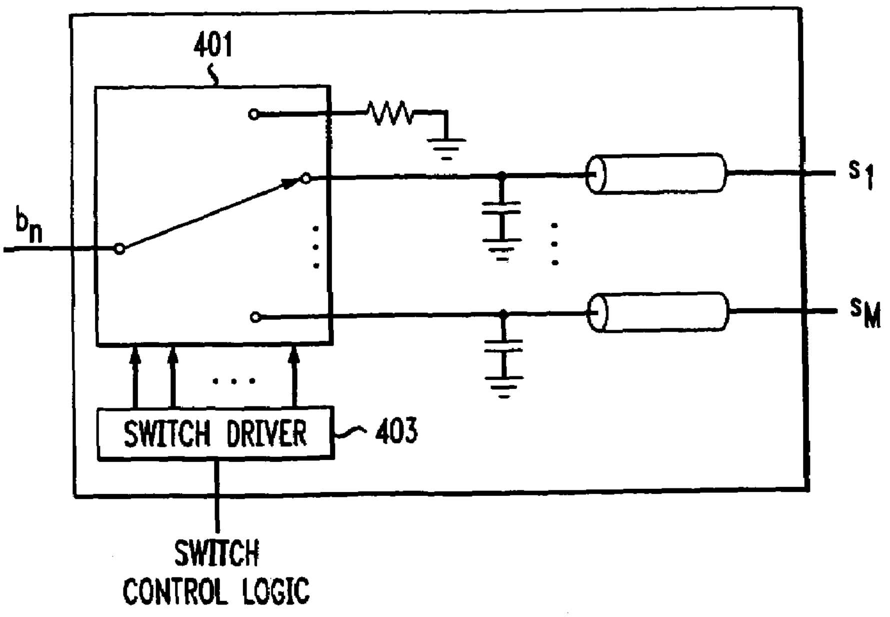
FIG. 4 illustrates an embodiment of a switch element which can be used in the switch network of FIG. 3.

An example of the switch elements shown in FIG. 3 is illustrated in block diagram form in FIG. 4. Each of the switch elements can include a plurality of output lines $s_1$ to $s_M$ which indicate to which of the output ports of the switch network this particular switch element is providing its beam. There is a single pole M+1 throw RF switch, 401. This single pole switch (shown coupling the received beam $b_n$ to output line $s_1$) has one input and M+1 switch points where M of the switch points are connected to the M output ports of the switch network and the M+1 output is connected to a terminating load. The transmission line length between the single pole switch to a given transceiver/receiver port $s_m$ should be a multiple of a half-wavelength. This arrangement transforms the open circuit of the switch to an open circuit at the corresponding transceiver/receiver port sm. In practice, there will be some shunt capacitance to ground at each switch when open. This can be compensated for by shortening the multiple-half-length waveline to ensure that the impedance at the transceiver/receiver port is effectively an open circuit at the center frequency of operation. The entire switch network allows any port of the beamformer to be either terminated with its characteristic impedance or selectively connected to any of the transceiver/receiver ports without introducing loading effects to the desired signal paths. The switch 401 operates under the control of the switch driver 403 which receives the switch control logic from the digital signal processor 230 of FIG. 2.

As indicated above, the selected outputs of the exclusion logic N-to-M switch network are provided to the primary transceiver and the auxiliary receivers, 215 and 220 respectively. The primary transceiver and auxiliary receivers perform the typical radio functions such as frequency conversion, filtering, amplification of signals and digital-to-analog conversion or analog-to-digital conversion. There are many types of architectures for transceivers and receivers such as single-stage conversion, multi-stage conversion, direct sampling and software radio. The system of the present invention does not impose any requirement on which type of architecture to be used, however.

The DSP performs a number of key functions in addition to the baseband signal processing functions that are required to extract the desired signal; namely the DSP selects the primary beam and the auxiliary beams, provides the exclusion logic to control the switch network in accordance with the selections, and combines the primary beam and the auxiliary beams based on an optimal criterion to produce an output digital signal y. The output signal y is to be demodulated to produce the binary stream that carries the received message.

In one potential operation of the present invention, the DSP selects that beam among the N beams which is the beam in which the desired signal is strongest and designates that particular beam as the primary beam. The DSP then selects M−1 beams among the remaining M−1 beams to be auxiliary beams. There are k number of possible sets of auxiliary beams where $$K = \frac{(N-1)!}{(M-1)!\,(N-M)!} \tag{1}$$

(1)

For each of the k sets, a covariance matrix is formed with its outputs together with that of the primary beam; that is, $$R=[x_1, x_2 \ldots x_m]^H[x_1, x_2 \ldots x_m] \tag{2}$$

where H denotes the Hermitan transpose operation and $x_m$ denotes the output of the nth transceiver/receiver. The best choice of auxiliary beams will be set with its covariance matrix having the largest Eigen value.

Having selected the primary and auxiliary beams, the DSP then provides a switch control logic to the switching elements so as to enable the appropriate selection of the beams and designation to the appropriate receiver ports. The switch control logic serves two purposes: 1) it encodes the beam selection signal into the appropriate one out of M+1 signals to drive the switch to select either the terminating load or one of the M transceiver/receiver ports; 2) it inhibits any beam port $b_m$ from being connected simultaneously to more than two transceiver/receiver ports. The switch encode and exclusion logic are both implemented as minimized Boolean logic, which is programmed as an algorithm within the digital signal processor. However, the logic can also be realized using a programmable gate array or an application-specific integrated circuit (ASIC).

As indicated above, the DSP is also responsible for combining the selected primary and auxiliary beams after they are chosen. In one example, the selected signals will be weighted and combined to produce the output $$y = \sum_{M=1}^{M} X_m W_M = [x_1, x_2, \ldots x_m][w_1, w_2, \ldots w_m]^H \tag{3}$$

where $$\{w_M\}\frac{M}{N} = 1 \tag{4}$$

represent the rates for the outputs of the beams. There are many suitable optimal criteria that can be used to derive the rates. For example, one may choose to minimize the squared-error $|d-y|^2$ with respect to $w=[w_1, w_2, \ldots w_m]$ where d denotes the desired signal.

The digital signal processor could be implemented using a Texas Instruments TI 500 series DSP or Motorola 56000 series DSP to achieve the processing desired.

It should also be noted at this time that the switch network could be implemented using any one of a plurality of devices such as a GaAs FET switch matrix, an external programmable gate array, or other logical device arrangements.

The present invention provides a technique for more optimally combining beams in connection with a transmission between two terminal stations over a wireless communications system. The present invention avoids the need to specially direct antennas but rather selects among a plurality of antennas those signals which provide an optimal beam combination utilizing a plurality of receivers.

What is claimed is:

1. A method comprising:

capturing wireless signals on a plurality of antennas;

forming a plurality of beams from outputs of the antennas;

selecting a subset of the beams for processing by a plurality of receivers, wherein the subset includes the strongest beam;

processing the strongest beam by a primary transceiver of the plurality of receivers;

outputting, from the receivers, processed signals corresponding to the beams; and extracting a message from the processed signals.

2. The method of claim 1, wherein the extracting comprises:

assigning weights to the processed signals;

combining the weighted signals; and generating therefrom an output signal.

3. The method of claim 2, further comprising demodulating the output signal to obtain the message.

4. The method of claim 1, wherein the other beams of the subset are processed by auxiliary receivers of the plurality of receivers.

5. A method comprising:

receiving wireless signals on a plurality of antennas;

forming a plurality of beams from outputs of the antennas;

applying exclusion logic to select a strongest beam and auxiliary beams;

providing the strongest beam to a primary transceiver and the auxiliary beams to auxiliary receivers;

processing the strongest beam in the primary transceiver and the auxiliary beams in the auxiliary receivers; and extracting information encoded in the processed beams.

6. The method of claim 5, wherein the extracting comprises providing the processed beams to a digital signal processor, weighting and combining the processed beams using the digital signal processor, and demodulating an output signal of the digital signal processor.

7. The method of claim 6, wherein the digital signal processor is coupled to the exclusion logic and provides signals thereto to control the selecting.

8. A system comprising:

an N-element antenna array;

a beam former coupled to the array;

exclusion logic coupled to the beam former to select a subset of outputs of the beam former, wherein the subset includes the strongest beam;

a plurality of receivers coupled to the exclusion logic to process the selected subset, wherein the plurality of receivers includes a Primary transceiver to process the strongest beam; and processing logic coupled to the plurality of receivers to extract information from the subset processed by the receivers.

9. The system of claim 8, wherein the plurality of receivers includes auxiliary receivers to process other beams of the subset.

10. The system of claim 8, wherein the processing logic comprises a digital signal processor to assign weights to signals corresponding to the processed subset, and combine the weighted signals.

11. The system of claim 10, wherein the processing logic further comprises a demodulator to extract a message from an output signal of the digital signal processor.

12. The system of claim 8, wherein the processing logic is coupled to the exclusion logic and controls the selection of the subset.

* * * * *